(12) United States Patent
Pan

(10) Patent No.: US 8,107,409 B2
(45) Date of Patent: Jan. 31, 2012

(54) OAMP FOR DISTRIBUTED MOBILE ARCHITECTURE

(75) Inventor: Shaowei Pan, Kildeer, IL (US)

(73) Assignee: Lemko Corporation, Schaumburg, IL (US)

( * ) Notice: Subject to any disclaimer, the term of this patent is extended or adjusted under 35 U.S.C. 154(b) by 830 days.

(21) Appl. No.: 12/171,840

(22) Filed: Jul. 11, 2008

(65) Prior Publication Data
US 2010/0008306 A1 Jan. 14, 2010

(51) Int. Cl.
*H04W 4/00* (2009.01)
(52) U.S. Cl. ......... 370/315; 370/331; 370/332; 370/230
(58) Field of Classification Search .................. 370/230, 370/315, 332, 331; 455/11.1
See application file for complete search history.

(56) References Cited

U.S. PATENT DOCUMENTS

| | | | |
|---|---|---|---|
| 6,418,308 B1 * | 7/2002 | Heinonen et al. | 455/414.3 |
| 2004/0204097 A1 * | 10/2004 | Scheinert et al. | 455/561 |
| 2006/0098661 A1 | 5/2006 | Pan | |
| 2006/0159039 A1 | 7/2006 | Jung et al. | |
| 2006/0234747 A1 * | 10/2006 | Pan | 455/519 |
| 2007/0087738 A1 * | 4/2007 | Melkesetian | 455/422.1 |
| 2007/0287452 A1 | 12/2007 | Pan | |
| 2009/0186626 A1 * | 7/2009 | Raghothaman | 455/452.2 |

OTHER PUBLICATIONS

International Search Report and Written Opinion received in corresponding PCT Application No. PCT/US2009/045968 from the International Searching Authority (KR) mailed Jan. 21, 2010, 13 pages.

* cited by examiner

*Primary Examiner* — Huy Vu
*Assistant Examiner* — Omer Mian
(74) *Attorney, Agent, or Firm* — Toler Law Group, PC

(57) ABSTRACT

A method of routing calls includes receiving a first call at a first distributed mobile architecture gateway (dMAG) from a legacy communication network. A routing path for the first call is determined based on register data associated with a mobile station, the routing path including at least one component of each of the first dMAG, a first dMA node, and a private Internet Protocol (IP) network. One or more command messages are sent to reserve the components of the first dMAG, the first dMA node, and the private Internet Protocol (IP) network. One or more confirmation messages are received indicating that components of the first dMAG, the first dMA node, and the private IP network are reserved to route the first call. The first call is connected to the mobile station via the reserved components of the first dMAG, the first dMA node, and the private IP network.

30 Claims, 8 Drawing Sheets

| | dMA Node Register | dMA Node CLR | dMA Node VLR | Visitor dMA Node Register | Visitor dMA Node HLR | Visitor dMA Node VLR |
|---|---|---|---|---|---|---|
| 502 | Home dMA Node Register | HLR of each Home dMA Node | VLR of each Home dMA Node | Visitor dMA Node Register | HLR of each Visitor dMA Node | VLR of each Visitor dMA Node |
| 504 | dMA Node Register of 2$^{nd}$ dMAG | HLR of each dMA Node of 2$^{nd}$ dMAG | VLR of each dMA Node of 2$^{nd}$ dMAG | Visitor dMA Node Register of 2$^{nd}$ dMAG | HLR of each Visitor dMA Node of 2$^{nd}$ dMAG | VLR of each Visitor dMA Node of 2$^{nd}$ dMAG |
| 506 | dMA Node Register of 3$^{rd}$ dMAG | HLR of each dMA Node of 3$^{rd}$ dMAG | VLR of each dMA Node of 3$^{rd}$ dMAG | Visitor dMA Node Register of 3$^{rd}$ dMAG | HLR of each Visitor dMA Node of 3$^{rd}$ dMAG | VLR of each Visitor dMA Node of 3$^{rd}$ dMAG |

FIG. 5

OAMP FOR DISTRIBUTED MOBILE ARCHITECTURE

TECHNICAL FIELD

The present disclosure relates generally to distributed mobile architecture (dMA) systems. More specifically, example embodiments are directed to operations, administration, maintenance and provisioning (OAMP) in a dMA system.

BACKGROUND

Distributed mobile architecture (dMA) enables multiple dMA nodes (e.g., each dMA node including a dMA server and one or more base transceiver stations (BTSs) that service one or more mobile stations to be interconnected via Internet Protocol (IP) connections.

This interconnectivity defines a dMA network in which voice and data calls to and from the one or more mobile stations may be switched at the edge of the dMA network (e.g., via the dMA nodes). This interconnectivity reduces a need for backhaul of traffic to a mobile switching center (MSC) over a backhaul infrastructure that is ubiquitous in and a major contributor to high costs of the existing mobile networks.

Multiple dMA gateways (dMAGs) may be employed in the dMA network to provide switching of voice and data calls to and from one or more of the plural legacy networks, including public switch telephone networks (PSTNs), IP networks, other wireless systems, and the like, while keeping the edge-switching efficiencies of the dMA network.

Each of the dMAGs may be associated with one or more of the multiple dMA nodes. Some or all of the dMA nodes may roam between different dMAGs. The OAMP services should be capable of servicing the changing topology of the dMA network.

BRIEF DESCRIPTION OF THE DRAWINGS

Some embodiments are illustrated by way of example and not limitation in the figures of the accompanying drawings in which:

FIG. 5 illustrates a table showing example data associated with a dMAG, in accordance with FIGS. 1-3;

DETAILED DESCRIPTION

Figure 1:
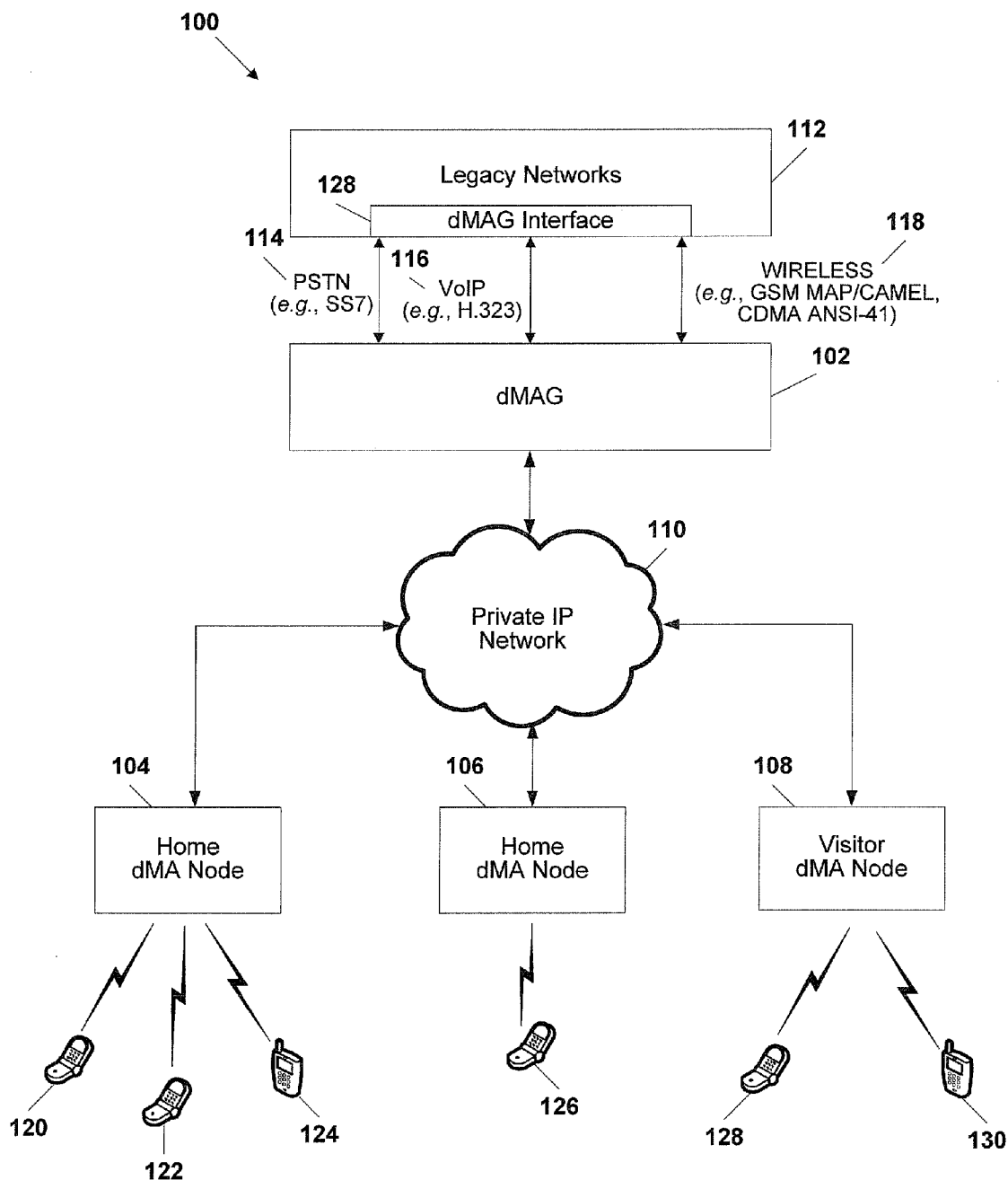
FIG. 1 is a block diagram of an example distributed mobile architecture (dMA) network that includes a dMA gateway (dMAG), which provides one or more of plural dMA nodes with service to one or more of plural legacy networks.

Example embodiments are directed to operations, administration, maintenance and provisioning (OAMP) in a dMA system.

In accordance with an embodiment, there is provided a method of routing calls via a communications network, the method comprising: receiving a first call at a first distributed mobile architecture gateway (dMAG) from a legacy communication network, the first call placed to a mobile station accessible via the first dMAG; determining a routing path for the first call based on register data associated with the mobile station, the routing path including at least one component of the first dMAG, at least one component of a first dMA node, and at least one component of a private Internet Protocol (IP) network; sending one or more command messages to reserve the at least one component of the first dMAG, the at least one component of the first dMA node, and the at least one component of a private Internet Protocol (IP) network along the routing path; receiving one or more confirmation messages indicating that the at least one component of the first dMAG, the at least one component of the first dMA node, and the at least one component of the private IP network are reserved to route the first call; and connecting the first call to the mobile station the reserved at least one component of the first dMAG, the reserved at least one component of the first dMA node, and the reserved at least one component of the private IP network.

In accordance with another embodiment, there is provided a distributed mobile architecture gateway (dMAG), comprising: a data storage device; a legacy network interface adapted to communicate with a legacy communication network; a home distributed mobile architecture (dMA) register including a list of a first group of dMA nodes, wherein the dMAG is designated to route calls directed to one or more mobile stations served by the first group of dMA nodes and to store performance data associated with each dMA node of the first group of dMA nodes; a visitor dMA register including a list of a second group of dMA nodes, wherein each dMA node of the second group of dMA nodes is roaming with respect to the dMAG and the dMAG is adapted to temporarily route calls directed to one or more mobile stations served by the second group of dMA nodes; a master agent adapted to receive performance data from each dMA node of the first group of dMA nodes and each dMA node of the second group of dMA nodes; and an operations module adapted to: store the performance data from each dMA node of the first group of dMA nodes in the data storage device; and send the performance data from each dMA node of the second group of dMA nodes to one or more additional dMAGs via a private IP network; wherein at least a portion of the calls routed by the dMAG are communicated via the legacy network interface.

In accordance with a further embodiment, there is provided a method of routing calls via a communications network, the method comprising: receiving a resource allocation query command message at a first distributed mobile architecture (dMA) node from a first distributed mobile architecture gateway (dMAG), the first dMA node roaming with respect to the first dMAG and the resource allocation query being related to a call directed to a mobile station adapted to communicate via the first dMA node; sending a response message to the first dMAG from the first dMA node, response message indicating that one or more components of the first dMA node are reserved for the call; receiving one or more packets related to the call at the first dMA node from the first dMAG via a private Internet Protocol (IP) network; sending one or more signals associated with the one or more packets related to the call to the mobile stations via a wireless transceiver integrated with the first dMA node.

In accordance with yet another embodiment, there is provided a distributed mobile architecture (dMA) node, comprising: a data network connection adapted to communicate with a private Internet protocol (IP) network; and a performance module adapted to: send first performance data to a first distributed mobile architecture gateway (dMAG) via the private IP network when the dMA node is in a first communication range of the first dMAG, the first performance data related to components of the dMA node and related to first calls routed via the dMA node when the dMA node is in the first communication range; and send second performance data to a second dMAG via the private IP network when the dMA node is in a second communication range of the second dMAG, the second performance data related to components of the dMA node and related to second calls routed via the dMA node when the dMA node is in the second communication range; wherein the dMA node is included in a home dMA register of the first dMAG when the dMA node is in the first communication range and when the dMA node is in the second communication range and wherein the dMA node is included in a visitor dMA register of the second dMAG when the dMA node is in the second communication range.

FIG. 1 is a block diagram of an example distributed mobile architecture (dMA) network 100 that includes a dMA gateway (dMAG) 102, which provides one or more of plural dMA nodes 104, 106 and 108 with service to one or more of plural legacy networks 112. Each of the dMA nodes 104, 106, 108 may include a dMA server and one or more base transceiver stations (BTSs), which are not shown for clarity and brevity, to provide cellular coverage site(s) to one or more mobile stations 120, 122, 124, 126, 128, 130. The dMA node 104 (via its included dMA server) may hand-off of and switch calls between BTSs that are associated with the dMA node 104. The dMA node 104 (via its included dMA server) may further provide hand-off of calls and switch calls made between a BTS associated with dMA 104 and a BTS associated with another dMA node, such as dMA nodes 106, 108. Other dMA nodes 106, 108 may operate similarly to dMA node 104 described above to provide switching and hand-offs. It should be noted that the number of dMA nodes 104, 106, 108 shown in FIG. 1 represents only one example and the number of dMA nodes may be varied depending on the requirements of the dMA network 100.

The dMA nodes 104, 106, 108 are interconnected to each other via a private IP network 110, such as via peer-to-peer connections, to provide for the switching and hand-off efficiencies between the dMA nodes 104, 106, 108 in the dMA network 100. The connections of dMA nodes 104, 106, 108 to a private IP network 100 may be a wired or wireless. The dMA nodes 104, 106, 108 are also interconnected to and registered with the dMAG 102 via the private IP network 110 to provide switching of calls between the legacy networks 112 and the dMA nodes 104, 106, 108. In turn the legacy networks are interconnected to the dMAG 102 via a dMAG interface 128. The dMAG interface 128 directs call traffic between the legacy networks 112 and the dMAG 102. The connection of the dMAG 102 to the dMAG interface 128 may also be wired or wireless.

Although only one dMAG 102 is shown for brevity and clarity, the dMA nodes 104, 106, 108 may be mobile and may roam between different dMAGs in the dMA network 100. For example, dMA nodes 104 and 106 are home dMA nodes that are associated with and considered local to dMAG 102, while dMA node 108 is a visitor dMA that has roamed via the private IP network 110, registering with the dMAG 102. In addition, one or more mobile stations may be associated with and be considered local to a particular dMA node, while other one or more mobile stations may roam via the particular dMA node. For example, the mobile stations 120 and 122 may be local to the home dMA node 104, while mobile station 124 may be associated with the home dMA node 106 and may further be roaming via the home dMA node 104. As another example, mobile stations 128, 130 and may be associated with the home dMA nodes 104, 106, respectively, while mobile station 126 may be associated with the visitor dMA node 108 and may further be roaming via the home dMA node 106.

The dMAG 102 is associated with plural dMA nodes 104, 106, 108 that register with the dMAG 102 and the dMAG 102 controls switching of calls between the legacy networks 112 and the dMA nodes 104, 106, 108 to provide the one or more mobile stations associated with the respective dMA nodes service to and from the legacy networks 112. The legacy networks 112 may include a public switch telephone network (PSTN), an Internet Protocol (IP) network, one or more wireless networks, and the like. As an example, call between the dMA network 100 and the PSTN network may utilize Signaling System #7 (SS7) 114, calls between the dMA network and the IP network may utilize VoIP (H.323) 116 to set up calls, and calls between the dMA network 100 and the one or more wireless networks may utilize MAP/CAMEL (GSM and WCDMA), ANSI-41 (AMPS, IS-136 (TDMA) and CDMA), and the like 118.

Figure 2:
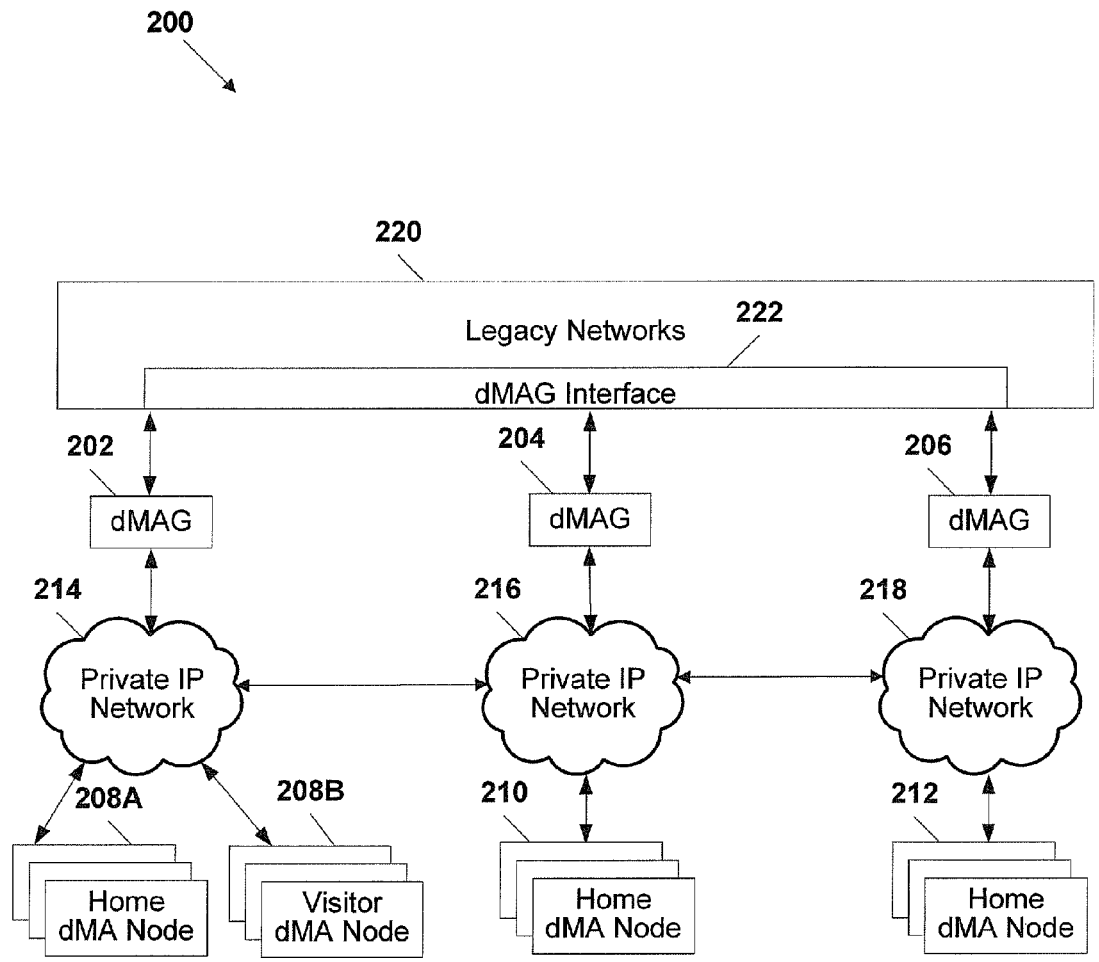
FIG. 2 is a block diagram of an example embodiment of a dMA network that includes plural dMAGs.

FIG. 2 is a block diagram of an example embodiment of a dMA network 200 that includes plural dMAGs 202, 204, 206. The dMA nodes of each dMA node group 208 (208A, 208B), 210, 212, are interconnected to each other via respective private IP networks 214, 216, 218, such as via peer-to-peer connections, and the private IP networks 214, 216, 218 are also interconnected via wired or wireless IP connections. The interconnections provide for the switching and hand-off efficiencies between the dMA nodes of the dMA node groups 208, 210, 212 in the dMA network 200.

The connections of the dMA nodes in the dMA node groups 208 (208A, 208B), 210, 212 to the respective private IP networks 214, 216, 218 may likewise be a wired or wireless. Each of the dMA node groups 208, 210, 212 may include one or more home dMA nodes and/or one or more visitor dMA nodes. For example, dMA node group 208 is shown to include one or more home dMA nodes 208A that are local to and registered with the home dMAG 202 and one or more visitor dMA nodes 208B that are roaming via the private IP network 214 and are registered with the dMAG 202.

Each of the dMAGs 202, 204, 206 is associated with and interconnected to the dMA nodes of a respective dMA node group 208 (208A, 208B), 210, 212 via a respective private IP network 214, 216, 218 to provide switching of calls between the legacy networks 220 and the dMA nodes of the respective dMA node group 208, 210, 212. The legacy networks 220 are interconnected to the dMAGs 202, 204, 206 via a dMAG interface 222. The dMAG interface 222 directs call traffic between the legacy networks 220 and the dMAGs 202, 204, 206. The connection of the dMAGs 202, 204, 206 to the dMAG interface 222 may also be wired or wireless.

Each dMAG 202, 204, 206 may maintain or access necessary information from a remote source (e.g., a remote database) to enable the respective dMAG 202, 204, 206 to switch (connect) calls between the legacy networks 220 and the dMA nodes of the respective dMA node group 208, 210, 212. Example information that may be maintained or accessed remotely may include a home dMA node register for each dMAG 202, 204, 206, a visitor dMA node register for each dMAG 202, 204, 206, a home location register (HLR) and a visitor location register (VLR) for each home dMA node and visitor dMA node, and the like. Example information maintained or accessed remotely will be described in greater detail below with reference to FIG. 5.

Figure 3:
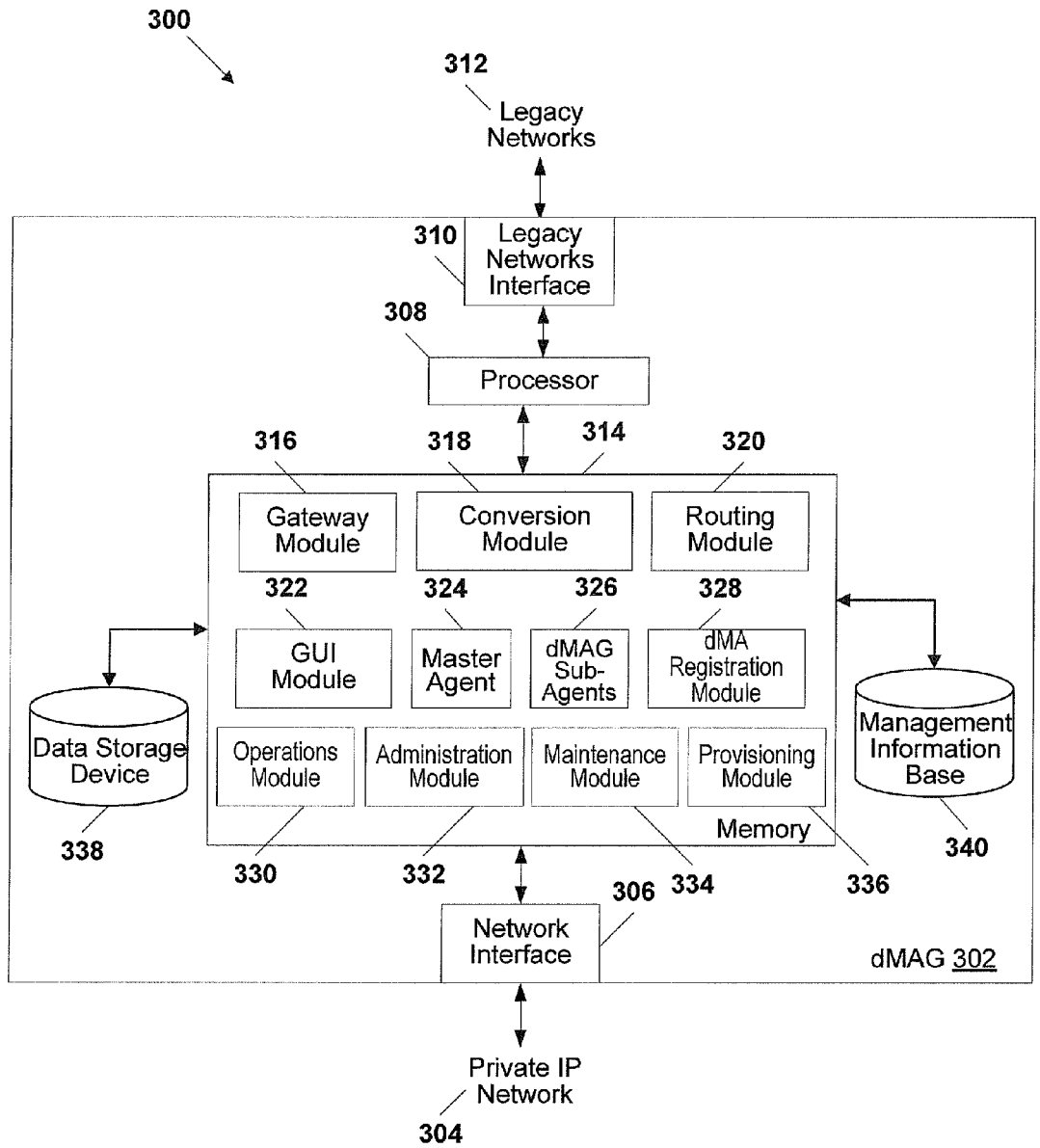
FIG. 3 is a block diagram of an example dMAG in accordance with FIGS. 1 and 2.

FIG. 3 is a block diagram 300 of an example dMAG 302 in accordance with FIGS. 1 and 2. The dMAG 302 includes a network interface 306 that interconnects the dMAG 302 to a private IP network 304 (e.g., private IP network 110, 214, 216, 218). The dMAG 302 also includes a legacy networks interface 310 that interconnects the dMAG 302 to one or more legacy networks 312 (e.g., legacy networks 112, 220). Further, the dMAG 302 includes a processor 308 that executes one or more of the various modules 316-334 stored on a memory device 314 to provide telephony service between the private IP network 304 (e.g., IP network 110, 214, 216, 218) and the legacy networks 312 (e.g., legacy networks 112, 220). The memory device 314 includes a gateway module 316, a conversion module 318, a routing module 320, a graphical user interface (GUI) module 322, a master agent module 324, one or more dMAG sub-agent modules 326, a dMA registration module 328 and OAMP service modules 330-336 that include an operations module 330, an administration module 332, a maintenance module 334 and a provisioning module 336.

Further with reference to FIG. 3, the gateway module 316 directs or controls call traffic from the private IP network 304 to the legacy networks 312 (e.g., legacy networks 112, 220) via the legacy networks interface 310. The conversion module 318 performs any conversion between Internet Protocol (IP) and the protocols associated with the legacy networks 312. The routing module 320 uses the registers of FIG. 5 to route call traffic from the legacy network 312 to the private IP network 304 via the network interface 306. The GUI module 322 generates one or more graphical user interfaces associated with the dMA network 100, 200 for setting up user accounts, billing, call tracking and the like. The dMA registration module 328 may register a home or a visitor dMA with the dMAG 302. The master agent 324 collects or monitors the performance of one or more components of the dMAG 302 and one or more components of the registered or associated dMA nodes via one or more sub-agents, and the master agent 324 may store monitored data in the data storage device 338 for later retrieval and use. More specifically, one or more dMAG sub-agents 326 may monitor the operation of one or more components of the dMAG 302. For example, a dMAG sub-agent 326 may be provided to monitor the connection to the private IP network 304 via the network interface 306, e.g., periodically or continuously measuring throughput via network interface 306. A dMAG sub-agent 326 may be provided to monitor the processing speed or operation of the processor 308. Yet another dMAG sub-agent 326 may be responsible for monitoring the remaining capacity of the data storage device 338. A dMAG sub-agent 326 may also be provided to monitor the connection to the legacy networks 312 via the legacy networks interface 310, e.g., periodically or continuously measuring throughput via network interface 310. As yet another example, a dMAG sub-agent 326 may be provided to monitor one or more dMA nodes (e.g., dMA nodes 104, 106, 108, dMA nodes of dMA node groups 208, 210, 212) registered with the dMAG 302.

Yet further with reference to FIG. 3, the operations module 330 may analyze the collected monitored data stored in data storage device 338 to detect and report faults in the operation of the various components in the dMAG 302 and the dMA nodes registered or associated with the dMAG 302, e.g., determining whether any component is not working optimally or has otherwise failed. The operations module 330 may also store or maintain fault reporting in the data storage device 338. The operations module 330 may store performance data in the management information base 340 for later retrieval and use. The administration module 332 may collect accounting and billing data, e.g., managing billing data for home and roaming accounts, generating and maintaining billing history and call history, and the like. The maintenance module 334 is responsible for distributing software updates for upgrades, fixes and new feature enablement to the registered or associated dMA nodes and mobiles stations associated with the dMA nodes registered with the dMAG 302. The provisioning module 336 is responsible for provisioning resources to a particular call, such as reserving or dedicating one or more components of the dMAG 302, dMA node and private IP network 304 for a routing path that connects a call from the legacy network 312 to the dMA node associated with a receiving mobile station.

Figure 4:
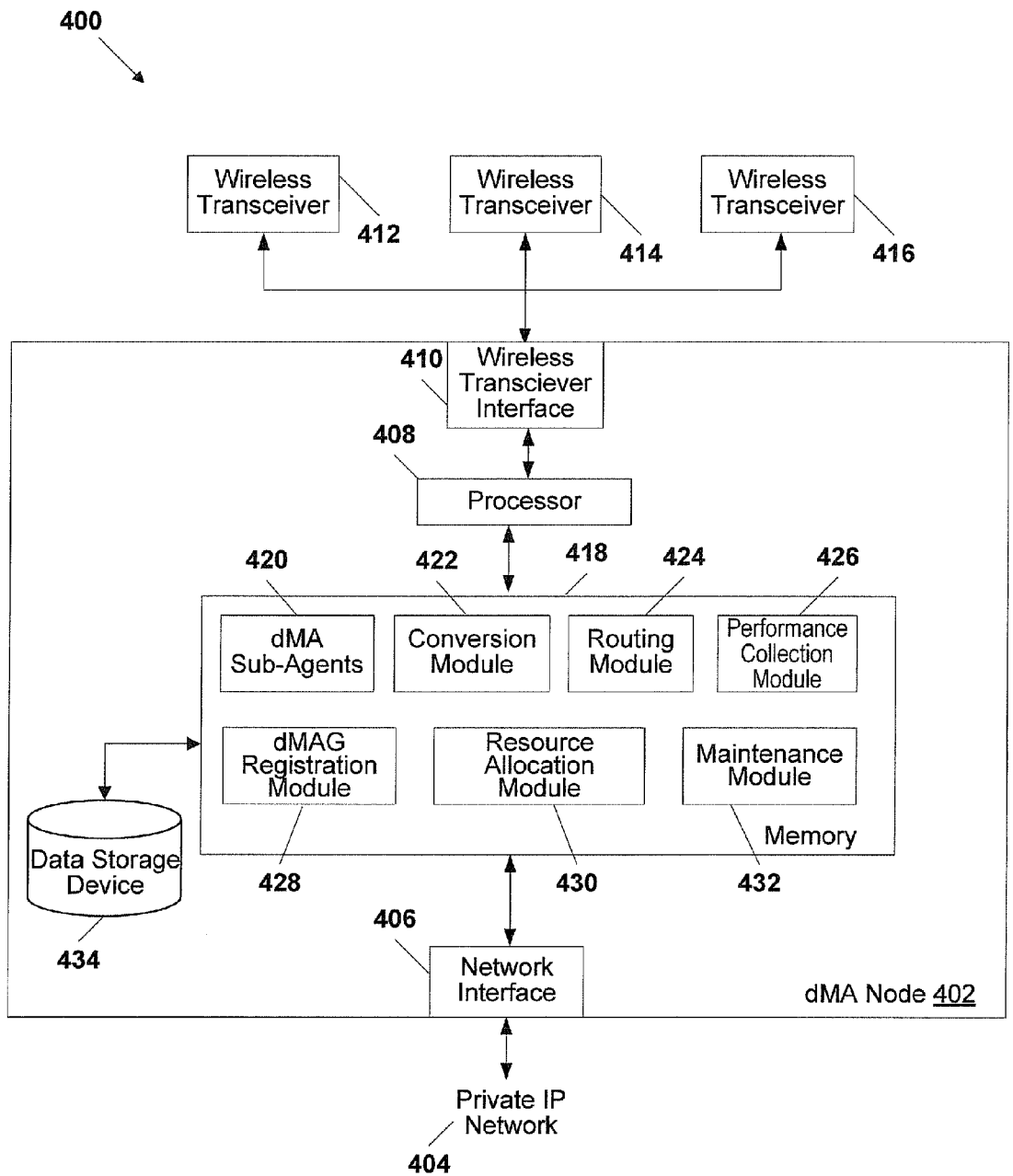
FIG. 4 is a block diagram of an example dMA node in accordance with FIGS. 1 and 2.

FIG. 4 is a block diagram 400 of an example dMA node 402 in accordance with FIGS. 1 and 2. The dMA node 402 includes a network interface 406 that interconnects the dMA node 402 to a private IP network 404 (e.g., private IP network 110, 214, 216, 218). The dMA node 402 also includes a wireless transceiver interface 410 that interconnects the dMA node 402 to one or more wireless transceivers 412, 414, 416, each of which may connect one or more mobile stations (e.g., mobile stations 120-130) to the dMA node 402 to enable wireless calls to and from the mobile stations. Further, the dMA node 402 includes a processor 408 that executes one or more of the various modules 420-432 stored on a memory device 418 to provide telephony service between the private IP network 404 (e.g., IP network 110, 214, 216, 218) and the wireless transceivers 412, 414, 416 to one or more mobile stations. The memory device 418 includes one or more dMA sub-agents 420, a conversion module 422, a routing module 424, a performance collection module 426, a dMAG registration module 428, a resource allocation module 430, and a maintenance module 432.

Further with reference to FIG. 4, one or more dMA sub-agents 420 may monitor the operation of one or more components of the dMA 402. For example, a dMA sub-agent maybe provided to monitor the connection to the private IP network 404 via the network interface 406, e.g., periodically or continuously measuring throughput via network interface 406. A dMA sub-agent 420 may be provided to monitor the processing speed or operation of the processor 408. Yet another dMA sub-agent 420 may be responsible for monitoring the remaining capacity of the data storage device 434. As yet another example, a dMA sub-agent 420 may also be provided to monitor the connection to the wireless transceivers 412, 414, 416 via the wireless transceiver interface 410, e.g., periodically or continuously measuring throughput via network interface 410. The conversion module 422 performs any conversion between Internet Protocol (IP) and the protocols associated with the mobile stations connecting to the dMA 402 via the wireless transceivers 412, 414, 416 (e.g., CDMA, GSM and the like). The routing module 424 uses the registers of FIG. 5 to route call traffic from mobile stations received via the wireless transceivers 412, 414, 416 to the private IP network 404 via the network interface 406.

Yet further with reference to FIG. 4, the performance collection module 426 may collect and store performance data in the storage device 436, which performance data may transmitted to the dMAG 302 periodically, continuously or on-request by the dMAG 302. The registration module 428 may automatically register the dMA node 402 to a dMAG 302 when the dMA roams via a private network associated with the dMAG 302. For example, visitor dMA node 108 may automatically register with dMAG 102 when the visitor dMA node 108 roams via the private IP network 110 associated with the dMAG 102. As another example, a visitor dMA node of the visitor dMA node group 208B may automatically register with the dMAG 202 when that visitor dMA node roams via the private IP network 214 associated with the dMAG 202. The dMAG with which the visitor dMA node registers may obtain that dMA node's home location register and visitor location register from the dMA node or the dMA node's home dMAG.

Still further with reference to FIG. 4, the resource allocation module 430 of the dMA 402 may receive a request from a dMAG 302 to connect a call to a mobile station via wireless transceiver 412, 414 or 416. In receiving the request, the resource allocation module 430 may determine whether it has sufficient resources to connect the call by determining whether there is sufficient throughput via the wireless transceiver 410, whether the processor is not overloaded, as well determining whether there are other pertinent constraints on the operation of the dMA node 402. If the resource allocation module 430 can connect the call, it allocates resources or components for the call and informs the dMAG 302 to connect the call. If the allocation module 430 cannot connect the call due to the foregoing constrains (e.g., a large number of calls currently connected via the dMA node 402), the allocation module 430 informs the dMAG that it cannot connect the call. The maintenance module 432 is responsible for receiving software or maintenance updates from the dMAG 302 for the dMA node and updating the memory 418 of the dMA node 402 with the updates, and further responsible for receiving mobile station software or maintenance updates and distributing these updates to the mobile stations.

FIG. 5 illustrates a table 500 showing example data associated with a dMAG, in accordance with FIGS. 1-3. More specifically, the table 500 illustrates in a graphical format the different databases of data that may be utilized by the dMAGs of FIGS. 1-3 to provide switching or connection of calls between the legacy networks and the dMA nodes (mobile stations) of FIGS. 1-3. Depending on the size of the dMA network 200, 300 in FIGS. 1-3, the number of dMAGs for which data is shown in FIG. 5 may increase or decrease accordingly. The table 500 illustrates different databases 508-518 each including one or more tables for a local or $1^{st}$ dMAG 502 (e.g., dMAG 102, 202), a $2^{nd}$ dMAG 504 (e.g., dMAG 204), and $3^{rd}$ dMAG 506 (e.g., dMAG 206).

The dMA node register database 508 includes a home dMA node register (e.g., one or more database tables) that identifies the dMA nodes (e.g., 104, 106, dMA nodes of dMA node group 208) which are associated with the local or $1^{st}$ dMAG 502 (e.g., dMAG 102, 202); a dMA node register (e.g., one or more database tables) of the $2^{nd}$ dMAG 504 (e.g., dMAG 204) identifies the dMA nodes (e.g., dMA nodes of the dMA node group 210) associated with the $2^{nd}$ dMAG 504; and a dMA node register (e.g., one or more database tables) of the $3^{rd}$ dMAG 506 (e.g., dMAG 206) identifies the dMA nodes (e.g., dMA nodes of the dMA node group 212) associated with the $3^{rd}$ dMAG 506.

The dMA node community location register (CLR) database 510 includes the home location register (e.g., database tables) for each of the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206). Each home location register of the dMA node CLR database 510 includes calling information for the home mobile stations that are associated respectively with the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206).

The dMA node VLR database 512 includes the visitor location registers (e.g., database tables) for the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206). Each visitor location register of the dMA node VLR database 512 includes calling information for the visitor mobile stations that are associated respectively with the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206).

The visitor dMA node register database 514 includes a visitor dMA node register (e.g., database table) that identifies visitor dMA nodes which are associated with the local or $1^{st}$ dMAG 502 (e.g., dMAG 102, 202); a visitor dMA node register (e.g., a database table) of the $2^{nd}$ dMAG 504 (e.g., dMAG 204) identifies visitor dMA nodes associated with the $2^{nd}$ dMAG 504; and a dMA node register of the $3^{rd}$ dMAG 506 (e.g., dMAG 206) identifies visitor dMA nodes associated with the $3^{rd}$ dMAG 506.

The visitor dMA node HLR database 516 includes the home location register (e.g., database tables) for each visitor dMA node of the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206). The home location register includes calling information for the mobile stations of each visitor dMA node that are associated respectively with the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206).

The visitor dMA node VLR database 518 includes a visitor location register (e.g., database tables) for each visitor dMA node of the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206). Each visitor location register includes calling information for the visitor mobile stations of each visitor dMA node that are associated respectively with the local or $1^{st}$ dMAG 502 (e.g., dMAG 102, 202), the $2^{nd}$ dMAG 504 (e.g., dMAG 204) and the $3^{rd}$ dMAG 506 (e.g., dMAG 206).

Figure 6:
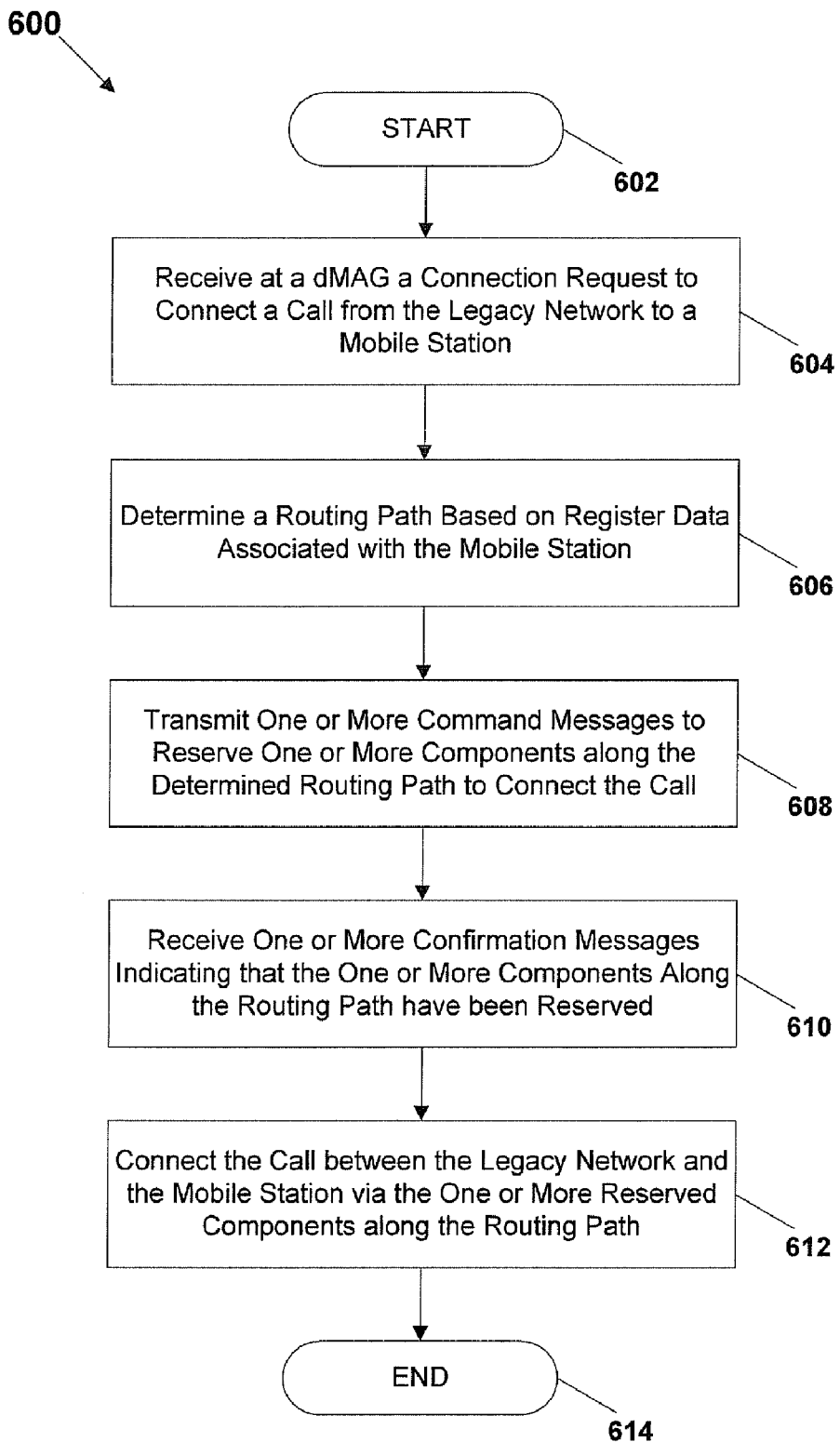
FIG. 6 is a flowchart of an example method to connect a call in the dMA networks of FIGS. 1 and 2.

FIG. 6 is a flowchart 600 of an example method to connect a call in the dMA network 100, 200. The example method begins at operation 602. At operation 604, a dMAG receives a connection request from a legacy network to connect a call to a mobile station. At operation 606, the dMAG determines a routing path based on register data associated with the mobile station. More specifically, the dMAG may access the databases illustrated in FIG. 5 to determine an IP address of the mobile station that is to receive the call and an IP addresses of a dMA node that is to connect the call to the mobile station, as well IP addresses of routers, switches and the like to be used to connect the call between the dMAG, dMA node and the mobile station. At operation 608, the dMAG transmits one or more command messages to reserve one or more components (e.g., dMA, routers, switches, etc.) along the determined path to connect the call. At operation 610, the dMAG receives one or more confirmation messages indicating that one or more components along the routing path have been reserved. Thereafter, at operation 612, the dMAG connects the call between the legacy network and the mobile station via the one or more reserved components along the routing path. The example method ends at operation 614.

Figure 7:
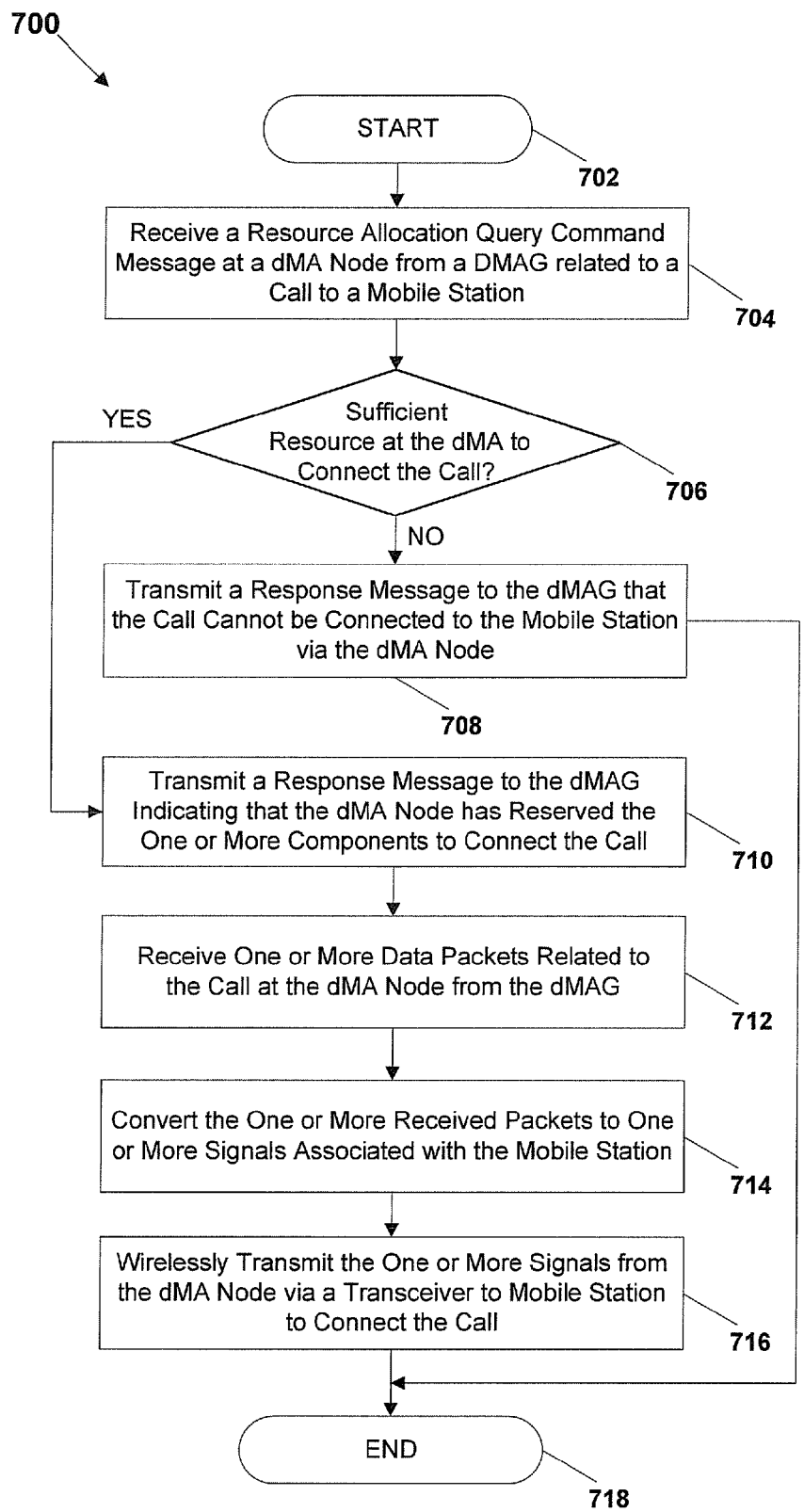
FIG. 7 is a flowchart of an example method to connect a call in the dMA networks of FIGS. 1 and 2.

FIG. 7 is a flowchart 700 of an example method to connect a call in the dMA network 100, 200. The example method begins at operation 702. At operation 704, a dMA receives a resource allocation query command message from a dMAG related to a call to a mobile station form a legacy network. At operation 706, the dMA determines whether there are sufficient resources to connect the call. If there are not sufficient resources, at operation 708, the dMA transmits a response message to the dMAG indicating that the call cannot be connected to the mobile station via the dMA, and at operation 718, the method 700 ends. Alternatively, if it is determined at operation 706 that there are sufficient resources, then at operation 710, the dMA transmits a response message to the dMAG indicating that the dMA node has reserved the one or more components of the dMA to connect the call. At operation 712, the dMA received one or more data packets related to the call from the dMAG, and at operation 714, the dMA converts the one or more received data packets to one or more signals associated with the mobile station. Thereafter, at operation 716, the dMA wirelessly transmits the one or more signals from the dMA node to the mobile station via a transceiver to connect the call from the legacy network to the mobile station. The example method ends at operation 718.

Figure 8:
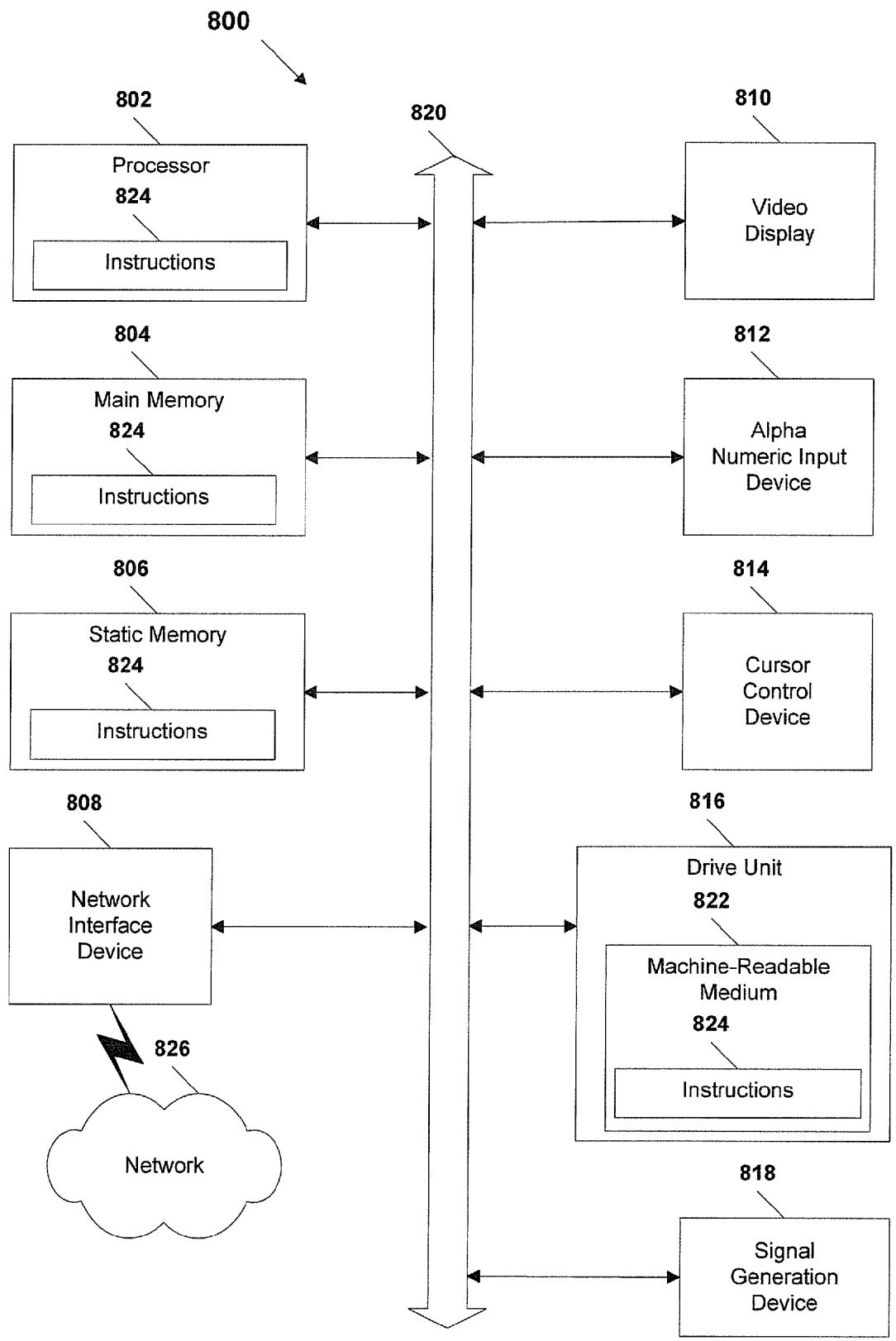
FIG. 8 is a block diagram illustrating an example computer system within which a set of instructions, for causing the computer system to perform any one or more of the methodologies disclosed in FIGS. 1-7, may be executed.

FIG. 8 is a block diagram illustrating an example machine in the example form of a computer system 800 within which a set of instructions, for causing the computer system to perform any one or more of the methodologies disclosed in FIGS. 1-7, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 820. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 808.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 808 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description In the following description, for purposes of explanation, numerous specific details are set forth in order to provide a thorough understanding of an embodiment of the present invention. It will be evident, however, to one skilled in the art that the present invention may be practiced without these specific details.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A distributed mobile architecture gateway (dMAG), comprising:
   a data storage device;
   a legacy network interface adapted to communicate with a legacy communication network;
   a home distributed mobile architecture (dMA) register including a list of a first group of dMA nodes, wherein the dMAG is designated to route calls directed to one or more mobile stations served by the first group of dMA nodes;
   a visitor dMA register including a list of a second group of dMA nodes, wherein each dMA node of the second group of dMA nodes is roaming with respect to the dMAG and the dMAG is adapted to temporarily route calls directed to one or more mobile stations served by the second group of dMA nodes;
a master agent adapted to receive performance data from each dMA node of the first group of dMA nodes and each dMA node of the second group of dMA nodes; and
an operations module adapted to:
store the performance data in the data storage device; and
send the performance data from each dMA node of the second group of dMA nodes to one or more additional dMAGs via a private IP network;
wherein at least a portion of the calls routed by the dMAG are communicated via the legacy network interface.

2. The dMAG of claim 1, further comprising a management information database (MIB), the MIB including performance requirements associated with the dMAG, the private IP network, each dMA node of the first group of dMA nodes, or any combination thereof.

3. The dMAG of claim 2, wherein the operations module is adapted to analyze performance data of a particular component of the dMAG, a particular component of the private IP network, or a particular component of one of the dMA nodes of the first group of dMA nodes with respect to a corresponding performance requirement to identify when an error condition occurs with respect to the particular component of the dMAG, the particular component of the private IP network, or the particular component of the one of the dMA nodes of the first group of dMA nodes.

4. The dMAG of claim 3, wherein the operations module is adapted to provide error condition data indicating the error condition with respect to the particular component of the dMAG, the particular component of the private IP network, or the particular component of the one of the dMA nodes of the first group of dMA nodes.

5. The dMAG of claim 4, wherein the error condition data includes a message to re-route a particular call.

6. The dMAG of claim 4, wherein the error condition data is sent to a technician, an error log stored at the dMAG, or both.

7. The dMAG of claim 1, wherein the performance data relates to a plurality of performance metrics.

8. The dMAG of claim 2, wherein the master agent is adapted to receive the performance data from one or more sub-agents of each component of the dMA nodes of the first group of dMA nodes.

9. The dMAG of claim 8, wherein the master agent, the one or more sub-agents of each component of the dMA nodes of the first group of dMA nodes, and the MIB communicate according to simple network management protocol (SNMP).

10. The dMAG of claim 8, wherein the master agent, the one or more sub-agents of each component of the dMA node of the first group of dMA nodes, and the MIB communicate according to an agent-X protocol.

11. The dMAG of claim 2, further comprising a maintenance module adapted to send software to each dMA node of the first group of dMA nodes.

12. The dMAG of claim 11, wherein the software includes updates to previous versions of software executed by each dMA node of the first group of dMA nodes.

13. The dMAG of claim 11, wherein the software replaces previous versions of software executed by each dMA node of the first group of dMA nodes.

14. The dMAG of claim 11, wherein the maintenance module is adapted to produce a backup copy of data stored in the MIB.

15. The dMAG of claim 2, wherein the performance data is stored in the MIB.

16. The dMAG of claim 1, wherein the legacy communication network is a public switched telephone network (PSTN), an integrated services digital network (ISDN), a wide-area wireless network, or a public IP network.

17. The dMAG of claim 1, wherein the performance data is associated with a wireless transceiver interface of each dMA node of the first group of dMA nodes, a wireless transceiver interface of each dMA node of the second group of dMA nodes, a wireless transceiver of each dMA node of the first group of dMA nodes, a wireless transceiver of each dMA node of the second group of dMA nodes, a data network connection of each dMA node of the first group of dMA nodes, a data network connection of each dMA node of the second group of dMA nodes, or any combination thereof.

18. The dMAG of claim 1, wherein the dMAG includes a graphical user interface (GUI) module adapted to produce at least one GUI related to presenting the performance data of each dMA node of the first group of dMA nodes, managing components of each dMA node of the first group of dMA nodes, managing components of the private IP network, presenting a configuration of a particular component of a dMA node of the first group of dMA nodes, presenting a configuration of a particular component of the dMAG, presenting a configuration of a particular component of the private IP network, or any combination thereof.

19. The dMAG of claim 18, wherein the at least one GUI is accessible via a display device coupled to the dMAG.

20. The dMAG of claim 18, wherein the at least one GUI is accessible via a display device located remotely from the dMAG.

21. The dMAG of claim 18, wherein the at least one GUI is accessible via an Internet portal.

22. The dMAG of claim 18, wherein the at least one GUI is configured according to an applet executable via a web browser.

23. The dMAG of claim 1, wherein the master agent is adapted to query at least one component of a particular dMA node of the first group of dMA nodes for specified performance data.

24. The dMAG of claim 1, wherein the dMAG includes an administration module adapted to generate and store billing information associated with the calls directed to the one or more mobile stations served by the first group of dMA nodes.

25. The dMAG of claim 1, further comprising a provisioning module adapted to reserve resources of the dMAG, resources of the private IP network, resources of at least one dMA node of the first group of dMA nodes, resources of at least one dMA node of the second group of dMA nodes, or any combination thereof, to route calls from the dMAG to the at least one dMA node of the first group of dMA nodes, to the at least one dMA node of the second group of dMA nodes, or both, based on the performance data.

26. A distributed mobile architecture (dMA) node, comprising:
a data network connection adapted to communicate with a private Internet protocol (IP) network; and
a performance module adapted to:
send first performance data to a first distributed mobile architecture gateway (dMAG) via the private IP network when the dMA node is in a first communication range of the first dMAG, the first performance data related to components of the dMA node and related to first calls routed via the dMA node when the dMA node is in the first communication range; and
send second performance data to a second dMAG via the private IP network when the dMA node is in a second communication range of the second dMAG, the second performance data related to the components of the dMA node and related to second calls routed via the dMA node when the dMA node is in the second communication range;

wherein the dMA node is included in a home dMA register of the first dMAG when the dMA node is in the first communication range and when the dMA node is in the second communication range and wherein the dMA node is included in a visitor dMA register of the second dMAG when the dMA node is in the second communication range.

27. The dMA node of claim 26, further comprising a wireless transceiver interface, a processor, a memory, a data storage device, or any combination thereof.

28. The dMA node of claim 27, further comprising one or more sub-agents adapted to monitor performance of the data network connection, the wireless transceiver interface, the processor, the memory, the data storage device, or any combination thereof.

29. The dMA node of claim 27, further comprising a configuration module adapted to:
store first configuration data related to the data network connection, the wireless transceiver interface, the processor, the memory, the data storage device, or any combination thereof; and
receive second configuration data related to the data network connection, the wireless transceiver interface, the processor, the memory, the data storage device, or any combination thereof, from the first dMAG.

30. The dMA node of claim 27, further comprising a maintenance module adapted to receive software updates from the first dMAG, wherein the software updates are related to the data network connection, the wireless transceiver interface, the processor, the memory, the data storage device, or any combination thereof, and wherein the software updates are based on the first performance data, the second performance data, or any combination thereof.

* * * * *